Figure 1:
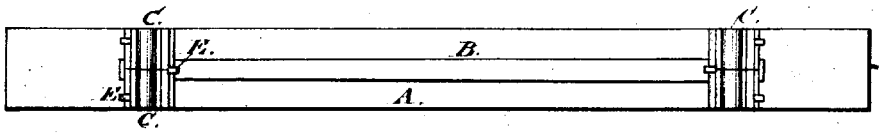

L. HALL,

Assignor, by mesne assignments, to the HALL MANUFACTURING CO.

Railroad-Tracks.

No. 7,941. Reissued Nov. 6, 1877.

*Witnesses:*
Pettit C. Allen.
John M. Hoon

*Inventor:*
Lowell Hall,
by Chas. F. Gobel
Atty

N. PETERS, PHOTO-LITHOGRAPHER, WASHINGTON, D. C.

UNITED STATES PATENT OFFICE.

LOWELL HALL, OF GRAND RAPIDS, MICH., ASSIGNOR, BY MESNE ASSIGNMENTS, TO THE HALL MANUFACTURING COMPANY, OF SAME PLACE.

IMPROVEMENT IN RAILROAD-TRACKS.

Specification forming part of Letters Patent No. 173,944, dated February 22, 1876; Reissue No. 7,941, dated November 6, 1877; application filed August 15, 1877.

*To all whom it may concern:*

Be it known that I, LOWELL HALL, of the city of Grand Rapids, Michigan, have invented a new and Improved Railroad-Rail and mode of laying the same, of which the following is a full and sufficient specification, reference being had to the accompanying drawing and letters of reference marked thereon.

Like letters in the several figures denote the same parts.

It is well known that the U-rail preceded the T-rail on railroads, but that the latter, when introduced, was found to answer the purpose better, and has entirely seperseded it.

It is equally well known that the U-rail presents certain obvious advantages over the T-rail, which, but for other disadvantages, would seem to render it the better rail. Its most obvious advantage arises from the fact that it furnishes a better support to the edges of the tread when under the vertical pressure of heavy weights; but in practice this advantage has been more than counterbalanced by its weak resistance to lateral pressure resulting from lateral oscillations of the rolling-stock. Attempts have been made to improve it in this respect by slightly inclining its sides outward from the edge of the tread to the foot-flange; but the advantage thus obtained was offset by the increased wear of the inner side of the rail and the outer side of the wheel-flange, the increased danger of fracturing the wheel-flange, and the increased danger of the wheels climbing the rail and running off the track.

In one instance an effort was made to obviate these difficulties by making the sides of the head vertical and inclining the webs outward about sixty degrees from each other—a construction which nearly destroyed the vertical strength of the webs, and rendered it necessary to tie them together at the bottom by a strong plate, and to fill the triangular space thus made in the rail with some supporting material, and which, even when thus supplemented, never commended itself to the judgment of railroad-engineers.

The object of the present invention, so far as it relates to the form of the rail, is to do away with all the disadvantages heretofore experienced in the U-rail without at the same time sacrificing its advantages; to which end the invention consists in the form of the rail, as I will now proceed to describe.

Another feature of my invention consists in combining my said improved rail with a wood filling; and still another feature of the invention consists in combining a railroad-rail with a tie and chair-bar, constructed as hereinafter described.

My rail, as distinguished from all others, is rolled in a single piece of metal, with a head having vertical sides, and with two webs inclined outward from the lower edge of the head at an angle of about fifteen degrees from a vertical line, the relative proportions of the several parts being substantially as shown in the drawing. The sides of the head are made vertical from their upper edge down to a point at or below the lateral wearing-surface of the wheel-flange, in order to relieve the rail as much as possible from frictional contact with said wheel-flanges, and to bring the line of such contact near the upper edge of the rail, where the head is hardest, and where the wheel-flanges are thickest and strongest. The rail is thereby protected from injury at or near the upper edges of the webs, where any abrasion would quickly weaken it, and the wheel-flanges are protected from fracture and from undue wearing at their thinnest part.

Having thus guarded the wheel-flanges and the supports of the rail from injury, I am enabled to incline the webs outward below the line of the head at any desired angle, for the purpose of bracing the head against the lateral forces constantly operating upon it when in use, and I can, for that purpose, use in my rail an inclination so great as to be utterly impracticable if continued to the top of the rail. Having attained this object, I now desire to render my rail completely self-supporting, so as to dispense with the necessity of a bottom plate or independent base; and to this end I adjust the inclination of the webs at such an angle as to give them, of themselves and without any assistance, the maximum of ability to both laterally and vertically support the head. This angle I have found by experiment, and by comparison of the vertical and lateral forces to which a rail is subject, to be at or about fifteen degrees from a vertical line, which is accordingly the inclination of the webs in my rail. The bottom flanges of the rail need not exceed half an inch to give the spikes a sufficient hold, and, reckoning the base of the rail as extending from the outer edge of one bottom flange to the outer edge of the other, I adjust the height of my rail thereto, my object being to bring the line of contact between the wheel-flange and rail-head at an elevation of about forty-five degrees from the outer edge of the opposite base-flange, so as to give the maximum of resistance against forces tending to tip the rail over. The result is that, with a minimum tread two inches wide and head one inch in vertical thickness, I have a rail substantially three and a half inches in height and four inches wide at the base, with the webs braced at fifteen degrees, as shown in the drawing. The thickness of the webs I recommend to be three-eighths of an inch for ordinary wear, although even a less thickness may suffice.

In a rail thus constructed the forces acting upon the head will, in almost every instance, be sustained by direct support, and not by the leverage of any of the parts, and the rail will thus possess the maximum of working strength and endurance.

Figure 2:
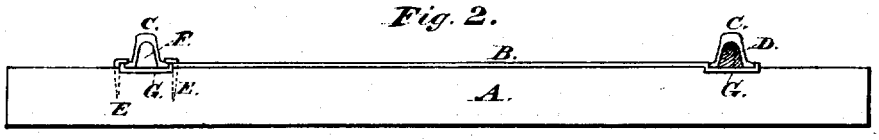
Figure 3:
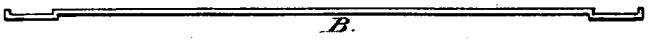
Figure 4:
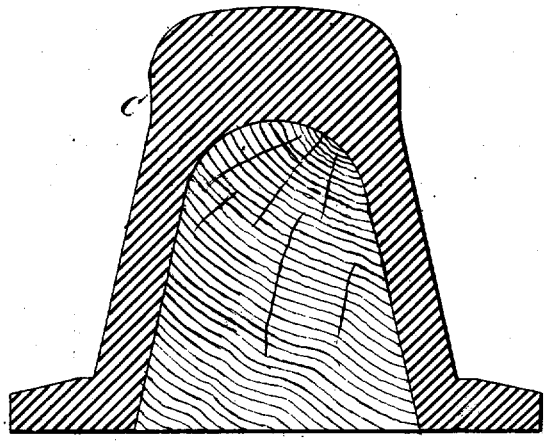

I fill the hollow section F, Fig. 2, in the rail C with wood (yellow or Norway pine, without sap, preferred) continuously, as indicated at D, Fig. 2, making the filling about one-sixteenth of an inch flush at the bottom, so that when the rail is drawn upon it by the spikes the rail is imprinted into it, and vibration is rendered impossible. The driving in of the spikes and the weight of passing trains compress this wood filling so that it becomes flush with the base of the rail, and by its use the rail is less liable to cut into the tie.

I obviate the spreading of the track at the joints by means of my chair-bar B in combination with spikes E E, as shown in Figs. 1 and 2. This chair is made of iron, of suitable width and thickness, and long enough to reach across the track at the joints from the outside of the rails. It is swaged at the ends the width of the bottom of the rails, and the swaged portion is let into the tie just its thickness, so that the top of the swaged portion is level with the surface of the tie. (See Fig. 2.) This chair-bar is secured in place by means of spikes E E, driven through it into the tie on the inside of the rails. (See left side of Figs. 1 and 2.)

My chair-bar not only obviates the spreading of the track at the joints, but it also dispenses with the common chair or fish-plates, bolts, and nuts, and tends to greatly relieve the pounding or abrasion of the rails at their joints, by resting their ends on the tie A evenly with the chair-bar B.

Having thus fully described my invention, what I claim as new, and desire to secure by Letters Patent, is—

1. The improved bridge-rail C, having substantially the relative proportions herein described, and having the sides of the head vertical and the webs inclined outward from the head down to the bottom flanges of the rail at an angle of substantially fifteen degrees, as and for the purpose herein specified.

2. The improved bridge-rail C, having the relative proportions herein described, and having the sides of the head vertical and the webs inclined at an angle of substantially fifteen degrees, in combination with the compressed wood filling D in the hollow section, substantially as and for the purposes set forth.

3. The combination, with the tie A, having grooves G, of the chair-bar B, swaged at the ends thereof for fitting in said grooves, as described, and for the reception of rails C, and secured therein in the manner substantially as and for the purpose specified.

LOWELL HALL.

In presence of—
CHAS. F. COBB,
JOHN M. HOON.